United States Patent
Chen et al.

(10) Patent No.: US 7,576,295 B2
(45) Date of Patent: Aug. 18, 2009

(54) METHOD FOR DETECTING AND COMPENSATING ELECTRODE WEAR OF ELECTRIC DISCHARGE MACHINING

(75) Inventors: Ming-Ji Chen, Yunlin County (TW); Jui-Kuan Lin, Taichung (TW); Chin-Hui Chen, Taichung (TW); Chao-Chuang Mai, Taichung (TW)

(73) Assignee: Industrial Technology Research Institue, Hsin-Chu (TW)

( * ) Notice: Subject to any disclaimer, the term of this patent is extended or adjusted under 35 U.S.C. 154(b) by 264 days.

(21) Appl. No.: 11/747,724

(22) Filed: May 11, 2007

(65) Prior Publication Data

US 2008/0173618 A1 Jul. 24, 2008

(30) Foreign Application Priority Data

Jan. 23, 2007 (TW) .............................. 96102431 A

(51) Int. Cl.
B23H 7/20 (2006.01)

(52) U.S. Cl. .................................. 219/69.17; 219/69.16

(58) Field of Classification Search .............. 219/69.13, 219/69.16, 69.17; 700/162
See application file for complete search history.

(56) References Cited

U.S. PATENT DOCUMENTS

| | | | | |
|---|---|---|---|---|
| 4,345,131 A | | 8/1982 | Semon et al. | |
| 5,354,961 A | * | 10/1994 | Diot et al. | 219/69.13 |
| 6,184,486 B1 | * | 2/2001 | Diot et al. | 219/69.17 |
| 6,521,856 B1 | * | 2/2003 | Marchesi et al. | 219/69.13 |
| 6,642,470 B2 | * | 11/2003 | Tricarico et al. | 219/69.17 |
| 6,759,620 B2 | * | 7/2004 | Marchesi et al. | 219/69.13 |
| 7,301,116 B2 | * | 11/2007 | Chen et al. | 219/69.16 |

FOREIGN PATENT DOCUMENTS

| | | | |
|---|---|---|---|
| JP | 9-76125 A | * | 3/1997 |
| JP | 2003-291033 A | * | 10/2003 |
| TW | 096102431 | | 2/2003 |

* cited by examiner

Primary Examiner—Geoffrey S Evans
(74) Attorney, Agent, or Firm—WPAT, PC; Justin I. King

(57) ABSTRACT

A method for detecting and compensating electrode wear of electric discharge machining (EDM) is disclosed, which comprises the steps of: defining a calibration node; calculating a wear length of a tool electrode by an edge-finding algorithm; using the calculated wear length of the tool electrode as a cut compensation for compensating a machining depth of next new tool electrode replacing the previously machined tool electrode; whereas the machining depth is obtained according to the following formula: the machining depth=designed depth of cut+predicted wear of the tool electrode for machining to desire depth−calculated wear length of the previously machined tool electrode+a through hole offset. With the aforesaid method, the wear of an used tool electrode can be detected automatically for compensating the machining depth of an unused tool electrode without ant additional equipment while achieving accurate machining.

14 Claims, 7 Drawing Sheets

METHOD FOR DETECTING AND COMPENSATING ELECTRODE WEAR OF ELECTRIC DISCHARGE MACHINING

FIELD OF THE INVENTION

The present invention relates to a method for detecting and compensating electrode wear of electric discharge machining (EDM), and more particularly, to a method, capable of automatically calculating an electrode wear of a tool electrode by an edge-finding algorithm while using the calculated electrode wear of the tool electrode as a cut compensation for compensating a machining depth of another tool electrode replacing the previously mentioned tool electrode, that is especially adapted for a process of blind hole machining with high accuracy.

BACKGROUND OF THE INVENTION

Electric discharge machining (EDM) uses electrical discharges to removal material from the workpiece. As result of this, some material is removed from the tool electrode. This is termed as 'electrode wear' in EDM. Electrode wear is a serious drawback of the EDM process. Many studies have been conducted till now, to study the electrode wear phenomenon. The electrode wear depends on a number of factors, such as the size and shape of the tool electrode, the material of the workpiece to be processed, the surface roughness of the workpiece, and so on, which are associated with discharging parameters programmed in the EDM process, like discharging waveform, voltage, servo parameters, etc.

The drilling of holes ranging in diameter from 0.08-3.00 mm without any burrs and free of tapers is largely the domain of electric discharge machining (EDM). Typically, these holes are drilled using a hollow electrode for supplying fluid to the bottom of such micro hole so as to wash out debris and thus prevent shortage. It is known that a fast removal rate can be obtained when negative polarity EDM machining is used with an EDM process, that is, tool electrode is cathode and workpiece is anode. However, the electrode wear of the negative polarity EDM machining is comparatively larger. In a negative polarity EDM machining as a uniform workpiece is processed under the same electric discharging conditions, its electrode wear is almost a constant per unit length of machining amount, in addition, the electrode is increasing with the smaller the diameter of the tool electrode is or the deeper the machining depth of a hole is. Thus, it is important to compensate the electrode wear.

In a method for compensating electrode wear of micro EDM disclosed in TW Pat. No. 90108713, the electrode wear is assumed to be a dynamic value that can be detected and measured in an automatic manner. In brief, an exact electrode wear of a hole, referring as first hole, is obtained by subtracting a tool electrode value detected prior to the machining of a second hole to be machined after the first hole with relation to the machined surface of a workpiece from a reference tool electrode value which is substantially being the tool electrode value detected prior to the machining of the first hole with relation to the machined surface of the same workpiece. After the exact electrode wear of the first is obtained, the obtained exact electrode wear of the first hole is used as a predicted wear of the tool electrode for machining the second hole to a desire depth, that is, the exact electrode wear of the first hole is used as the electrode wear of the second hole for machining to desire depth. It is assume that the electrode wear of any two successive cavities should be almost the same so that the actual depth of the machined second cavity can be compensated using the exact electrode wear of the first hole with minimum error. However, the aforesaid compensation method can only be applied to those holes machined by only a single tool electrode. When a originally used electrode is exhausted and another new tool electrode is replaced in a hole machining, the aforesaid method will perform no corresponding electrode wear detection and thus there will be no compensation so that machining depth error can not be prevented.

Therefore, in applications of EDM, the electrode wear must be considered while configuring a designed depth of cut so as to enable the actual depth to equal the designed depth. However, the aforesaid method can only work for machining holes using only a single tool electrode and will cause more error when the tool electrode is exhausted and replaced by another new tool electrode, since it can not provide a precise electrode wear of the exhausted electrode tool for the new tool electrode.

SUMMARY OF THE INVENTION

In view of the disadvantages of prior art, the primary object of the present invention is to provide a method for detecting and compensating electrode wear of an electric discharge machining (EDM) process, capable of automatically calculating an electrode wear of a used tool electrode while using the calculated electrode wear of the tool electrode as a cut compensation for compensating a machining depth of another tool electrode replacing the previously mentioned used tool electrode, by which a precise cut can be achieve even after the replacing of tool electrode.

It is another object of the invention to provide a method for detecting and compensating electrode wear of an electric discharge machining (EDM) process, capable of detecting and measuring an electrode wear in an automatic manner, by which time waste for configuration an electric discharge machining can be reduced and the accuracy of machining depth can be enhanced.

It is yet another object of the invention to provide a method for detecting and compensating electrode wear of an electric discharge machining (EDM) process, capable of performing an electrode replacement operation automatically.

It is further another object of the invention to provide a method for detecting and compensating electrode wear of an electric discharge machining (EDM) process, capable of machining a blind hole precisely and accurately.

To achieve the above objects, the present invention provides a method for detecting and compensating electrode wear of an electric discharge machining (EDM) process, comprising the steps of: defining a calibration node; calculating an electrode wear of a tool electrode by an edge-finding algorithm; and using the calculated electrode wear of the tool electrode as a cut compensation for compensating a machining depth of another new tool electrode replacing the previously mentioned used tool electrode, whereas the machining depth is obtained according to the following formula: the machining depth=designed depth of cut+predicted wear of the tool electrode for machining to desire depth−calculated electrode wear of the previously used tool electrode+a through hole offset. In which, the predicted wear of the tool electrode for machining to desire depth is obtained according to actual machining experience or a relating tool electrode compensation database with reference to the designed depth of cut.

Preferably, the calculated electrode wear of the previously used tool electrode is defined to be zero when a tool electrode, referring as the first electrode, is used in an discharge machining process for machining a through hole, in that the machining depth is obtained according to the following formula: the machining depth=designed depth of cut+predicted wear of the tool electrode for machining to desire depth+a through hole offset.

Preferably, the through hole offset is defined to be zero when the electric discharge machining process is operating for machining a blind hole, in that the machining depth is obtained according to the following formula: the machining depth=designed depth of cut+predicted wear of the tool electrode for machining to desire depth−calculated electrode wear of the previously used tool electrode.

Preferably, the calculated electrode wear of the previously used tool electrode is being defined to be zero and the through hole offset is also defined to be zero when a tool electrode, referring as the first electrode, is used in an discharge machining process for machining a blind hole, in that the machining depth is obtained according to the following formula: the machining depth=designed depth of cut+predicted wear of the tool electrode for machining to desire depth.

Preferably, the cut compensation for compensating a machining depth of another tool electrode replacing all the previously used tool electrode is equal to the sum of all electrode wear of tool electrodes used prior to the referring another tool electrode.

Preferably, a guide is disposed in front of the tool electrode and stabilizing the movement of the tool electrode, and calculated electrode wear of the previously used tool electrode is obtained according to the following formula:

calculated electrode wear=$(Zw1-Zw2)+(Z1+Z2)$;

wherein $Zw1$ is an electrode coordinate obtained by the use of the edge finding algorithm to electrode search downwardly along an edge of the tool electrode guided to positioned at a machining node before the tool electrode is used for electric discharge machining;

$Zw2$ is an electrode coordinate obtained by the use of the edge finding algorithm to electrode search downwardly along an edge of the tool electrode guided to positioned at the calibration node after the electric discharge machining;

$Z1$ is a distance between the guide and the machining node when the tool electrode is positioned at the machining node, and is obtained by the following steps: registering an original coordinate of the guide when it is on the machining node; removing the tool electrode away from the workpiece and thus receiving it into the guide while guide searching downwardly by the edge finding algorithm along an edge of the guide positioned at the machining node for obtaining a edged guide coordinate; and subtracting the edged guide coordinate from the original coordinate of the guide so as to obtain the distance; and $Z2$ is a distance between the guide and the calibration node when the guide is positioned at the calibration node, and is obtained by the following steps: registering an original coordinate of the guide when it is moved to the calibration node; guide searching downwardly by the edge finding algorithm along an edge of the guide positioned at the calibration node for obtaining a edged guide coordinate; and subtracting the edged guide coordinate from the original coordinate of the guide so as to obtain the distance.

Preferably, calculated electrode wear of the previously used tool electrode is obtained according to the following formula:

calculated electrode wear=$(Zw1-Zw2)+\Delta H$;

wherein $Zw1$ is an electrode coordinate obtained by the use of the edge finding algorithm to electrode search downwardly along an edge of the tool electrode guided to positioned at a machining node before the tool electrode is used for electric discharge machining;

$Zw2$ is an electrode coordinate obtained by the use of the edge finding algorithm to electrode search downwardly along an edge of the tool electrode guided to positioned at the calibration node after the electric discharge machining; and $\Delta H$ is the height difference between datum levels of the calibration node and the machining node.

Preferably, calculated electrode wear of the previously used tool electrode is obtained according to the following formula:

calculated electrode wear=$(Zw1-Zw2)$;

wherein $Zw1$ is an electrode coordinate obtained with respect to the tool electrode guided to positioned at a machining node before the tool electrode is used for electric discharge machining; and $Zw2$ is an electrode coordinate obtained with respect to the tool electrode guided to positioned at the calibration node after the electric discharge machining.

Preferably, both of the electrode coordinates $Zw1$, and $Zw2$, are obtained by the use of the edge finding algorithm to electrode search downwardly along an edge of the tool electrode.

Preferably, both of the electrode coordinates $Zw1$, and $Zw2$, are detected and obtained by the use of a sensor selected from the group consisting of an optical sensor, a CCD imaging device or a contact-type sensor.

Preferably, the calibration node is positioned on the workpiece at a datum level different from or the same as that of the machining node.

Preferably, the calibration node is positioned on a calibration block while being positioned at a datum level different from or the same as that of the machining node.

Preferably, when the aforesaid method is used for machining a blind hole, it is further comprises an error comparison step, in which a error is first being specified so as to be compared with an electrode wear, being calculated by performing the edge finding algorithm upon an electrode after it is being used for machining the blind hole on the workpiece to a designed depth of cut.

Preferably, the machining of the blind hole is complete when the error comparison step indicates that the calculated electrode wear is smaller than the specified error.

Preferably, when the error comparison step indicates that the calculated electrode wear is larger than the specified error, the electrode is moved back to the machining node of the blind hole for machining the same depth again, then performing the edge finding algorithm at the calibration node until the error comparison step indicates that the calculated electrode wear is smaller than the specified error.

Preferably, when the electrode is moved back to the machining node of the blind hole for machining the same depth again, the machining depth remains unchanged.

Preferably, the calculated electrode wear of a blind hole, referring as the first blind hole, is registered and used as basis for calculating a first machining depth of cut of another blind hole, referred as the second blind hole, to be machined for the first time machining right after the first blind hole. The machining depth of cut is recovered to originally desired hole depth after the first time machining in the same hole processing. Thus time waste for configuration an electric discharge machining can be reduced Preferably, the machining depth of the second blind hole to be machined for the first time machining right after the first blind hole is smaller than an calculated depth of cut of the of the second blind hole to be machined for the first time right after the first blind hole calculated based upon the predicted wear of the tool electrode for machining to desire depth.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
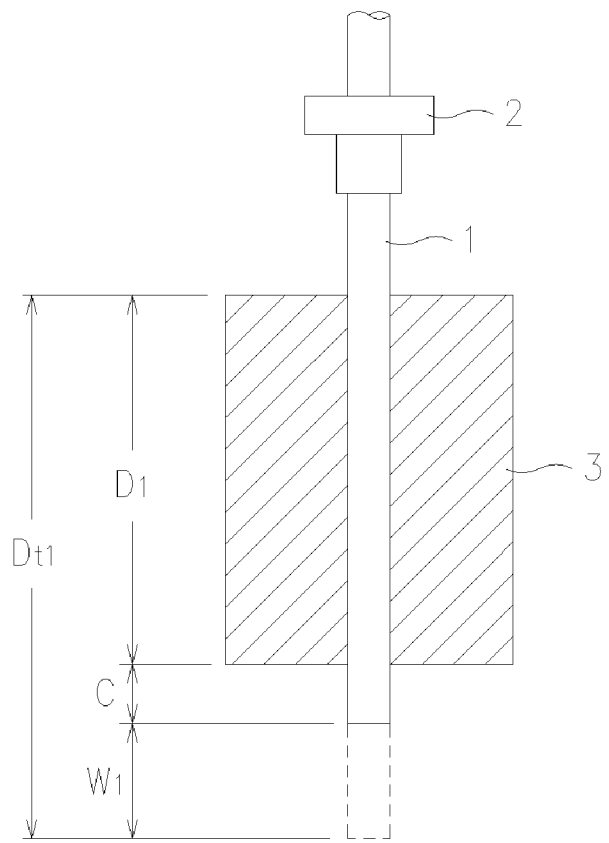
FIG. 1 is a schematic view is a schematic diagram illustrating a machining depth of a through hole, being formed by the use of an unused tool electrode to perform an EDM process upon a workpiece.

Please refer to FIG. 1, which is a schematic diagram illustrating a machining depth, being formed by the use of an unused tool electrode to perform an EDM process upon a workpiece. The tool electrode 1, capable of being moved freely in ant direction with respect to an EDM platform, has a guide 2 mounted at the front thereof in a manner that the tool electrode 1 passes through the center of the guide 2 so that the guide 2 can be used for guiding and stabilizing the movement of the tool electrode 1 and thus preventing the tool electrode 1 form rotating or deviating by the movement. Thereby, when the tool electrode 1 is used for performing an EDM process, the guide 2 is stationed for guiding the tool electrode 1 to be move downwardly while discharging.

Accordingly, the machining depth of the tool electrode 1 can be obtained according to the following formula:

the machining depth $Dt$=designed depth of cut $D$+predicted wear $W$ of the tool electrode for machining to desire depth−calculated electrode wear $Ww$ of the previously used tool electrode+a through hole offset $C$ (1)

Figure 2:
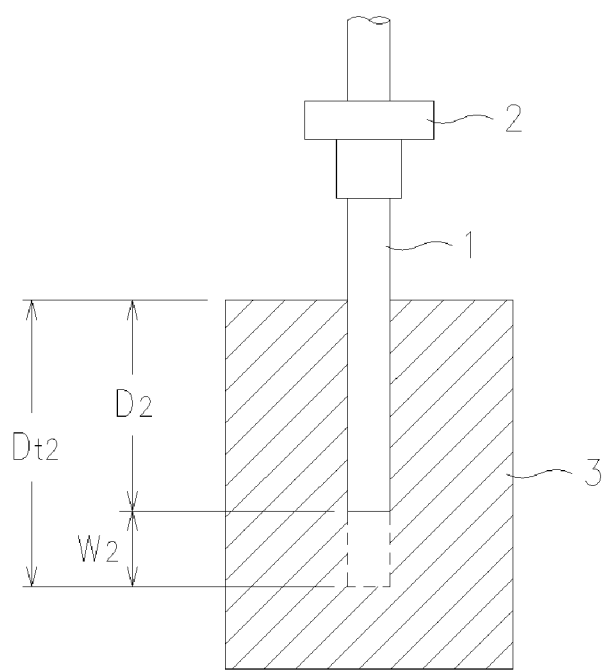
FIG. 2 is a schematic view is a schematic diagram illustrating a machining depth of a blind hole, being formed by the use of an unused tool electrode to perform an EDM process upon a workpiece.
Figure 3:
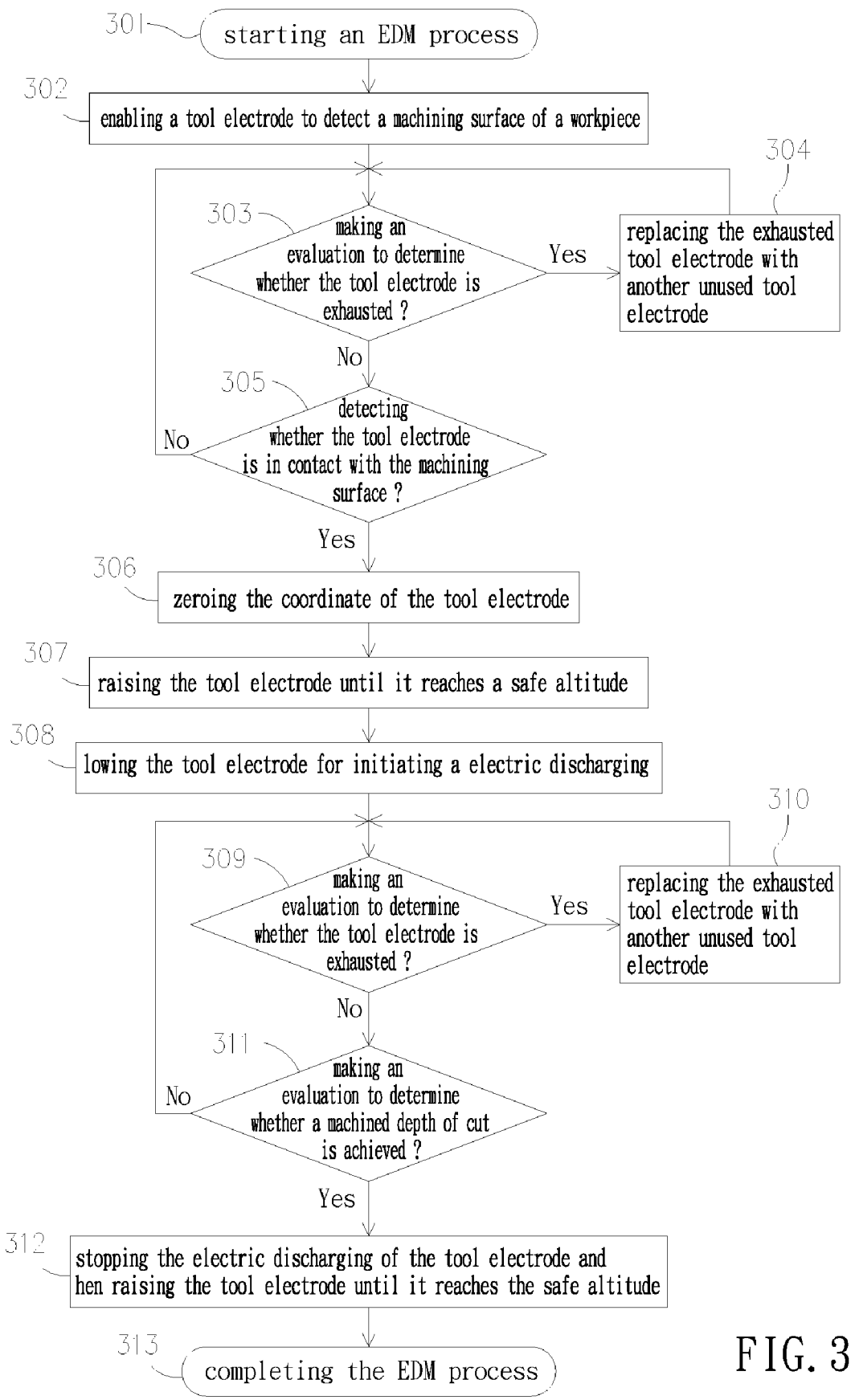
FIG. 3 is a flow chart showing the steps of a method for machining and replacing the exhausted electrode.

When a through hole process is being perform by the use of a new unused tool electrode, calculated electrode wear Ww of the previously used tool electrode is set to be zero, so that, as seen in FIG. 1, the machining depth of the unused tool electrode 1 upon a workpiece 3 can be obtained according to the following formula:

the machining depth $Dt1$=designed depth of cut $D1$+predicted wear $W1$ of the tool electrode for machining to desire depth+a through hole offset $C$ In addition, the through hole offset $C$ is defined to be zero when a blind hole process is being perform by the use of a new unused tool electrode, as seen in FIG. 2, thereby, the machining depth is obtained according to the following formula:

the machining depth $Dt2$=designed depth of cut $D2$+predicted wear $W2$ of the tool electrode for machining to desire depth Please refer to FIG. 3, which is a flow chart showing the steps of a method for detecting and compensating electrode wear of electric discharge machining according to the present invention. The method of FIG. 3 comprises the following steps:

301: starting an EDM process;
302: enabling a tool electrode to detect a machining surface of a workpiece;
303: making an evaluation to determine whether the tool electrode is exhausted;
304: replacing the exhausted tool electrode with another unused tool electrode;
305: detecting whether the tool electrode is in contact with the machining surface?
306: zeroing the coordinate of the tool electrode; wherein an edge-finding algorithm is used for registering an original length of the tool electrode 1;
307: raising the tool electrode until it reaches a safe altitude;
308: lowing the tool electrode for initiating an electric discharge machining;
309: making an evaluation to determine whether the tool electrode is exhausted?
310: replacing the exhausted tool electrode with another unused tool electrode;
311: making an evaluation to determine whether a designed depth of cut is achieved; if so, the EDM is completed;
312: stopping the electric discharge machining of the tool electrode and then raising the tool electrode until it reaches the safe altitude; and
313: completing the EDM process.

Before and during the performing of the EDM process, it is required to perform the evaluation step to determine whether the tool electrode is exhausted, as those shown in step 303 and step 309 so as to decide whether to perform the electrode replacement step, as those shown in step 304 and step 310. For compensating the electrode wear of those exhausted tool electrodes, it is required to calculated a electrode wear of the exhausted tool electrode to be used as the calculated electrode wear of the tool electrode as a cut compensation for compensating a machining depth of a new unused tool electrode replacing the previously exhausted tool electrode, which is substantially the calculated electrode wear Ww of the previously used tool electrode as illustrated in formula (1). It is noted that the formula (1) can also be applied for situations requiring a multiple replacing of tool electrode, as if when the first time the replacing of tool electrode is perform, the Ww only represent the electrode wear of the first tool electrode to be replaced, and when the second time the replacing of tool electrode is perform, the Ww will represent the sum of the electrode wears of the first replacing tool electrode and that of the second replacing tool electrode; and so on.

In an embodiment of the invention, a calibration node is being defined before the machining of the EDM process so as to be used as the datum point for calculating electrode wear. Zw2 is defined which is an electrode coordinate obtained by the use of the edge finding algorithm to electrode search downwardly along an edge of the tool electrode after the electric discharging of the tool electrode. It is noted that the calibration node can be either positioned on the workpiece or on a calibration block while being positioned at a datum level different from or the same as that of the machining surface of the workpiece. With respect to the different positions of the calibration node, the procedures for calculating electrode wear can be different, which can be divided into three types.

Figure 4:
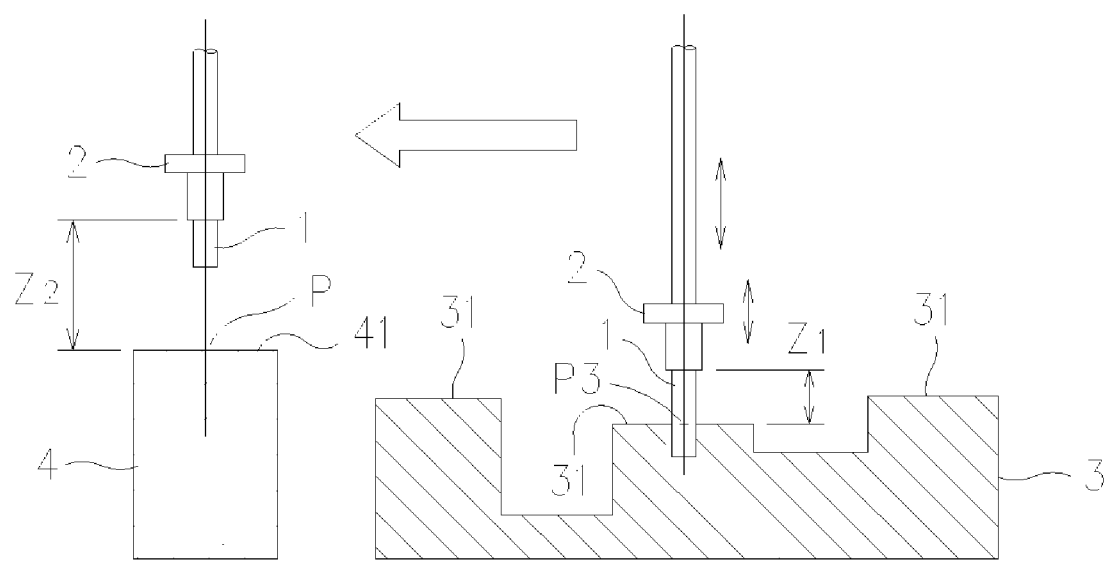
FIG. 4 is a schematic diagram showing the application of a tool electrode to perform EDM processes upon the machining depth of holes is the different; the machining nodes level and the calibration node level are not the same using the method of the invention.
Figure 5:
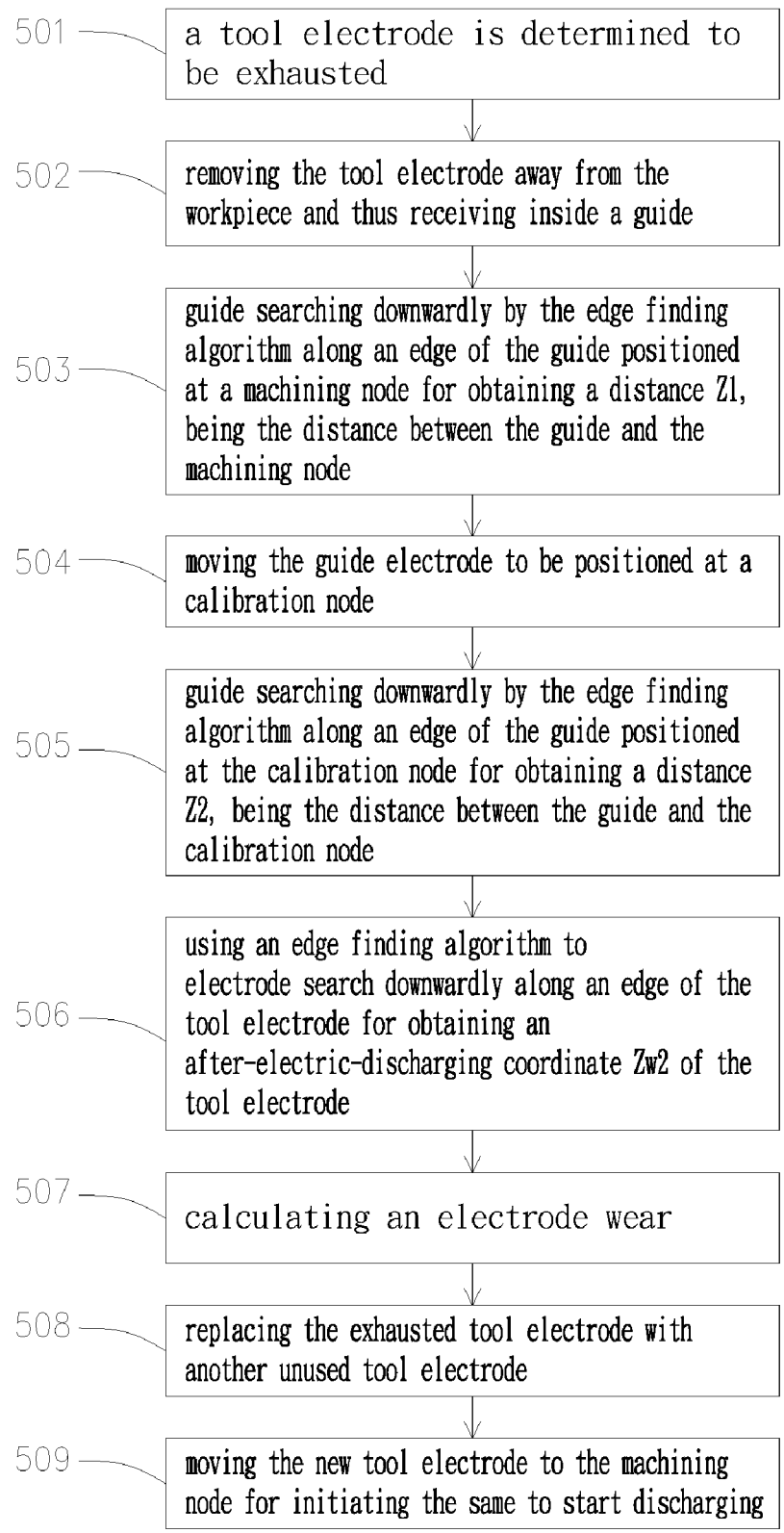
FIG. 5 is a flow chart showing the steps of electrode wear calculation used in the EDM processes of FIG. 4 according to the present invention.

Please refer to FIG. 4 and FIG. 5, which are respectively a schematic diagram showing the application of a tool electrode to perform EDM processes upon the machining depth of holes is the different; the machining nodes level and the calibration node level are not the same using the method of the invention and a flow chart showing the steps of electrode wear calculation used in the EDM processes of FIG. 4. As seen in FIG. 4, the tool electrode 1 is guided by a guide 2 for machining a workpiece 3 at different machining surfaces 31 of different datum levels. Each machining surface 31 is defined with a machining node P3, and a calibration block 4 with a calibration surface 41 is positioned next to the workpiece 3 whereas a calibration node P is defined on the calibration surface 41. It is noted that the datum level of the calibration surface 41 is different from that of the machining surface 31. Thereby, the electrode wear can be calculation according to the following formula:

$$\text{Electrode wear} = (Zw1 - Zw2) + (Z1 - Z2) \quad (2)$$

wherein Zw1 is an electrode coordinate obtained by the use of the edge finding algorithm to electrode search downwardly along an edge of the tool electrode guided to positioned at a machining node P3 before the tool electrode is used for electric discharge machining;

Zw2 is an electrode coordinate obtained by the use of the edge finding algorithm to electrode search downwardly along an edge of the tool electrode guided to positioned at the calibration node P after the electric discharge machining;

Z1 is a distance between the guide 2 and the machining node P3 when machining; the guide 2 is positioned to the machining node P, and is obtained by the following steps: registering an original coordinate of the guide 2 when it is guided to the machining node P3; removing the tool electrode 1 away from the workpiece 3 and thus rised into the guide 2 while guide 2 searching downwardly by the edge finding algorithm along an edge of the guide 2 positioned at the machining node P3 for obtaining a guide coordinate; and subtracting the edged guide coordinate from the original coordinate of the guide 2 so as to obtain the distance; and Z2 is a distance between the guide 2 and the calibration node P when the guide 2 is guided to the calibration node P, and is obtained by the following steps: registering an original coordinate of the guide 2 when it is moved to the calibration node P; guide 2 searching downwardly by the edge finding algorithm along an edge of the guide 2 positioned at the calibration node P for obtaining a guide coordinate; and subtracting the edged guide coordinate from the original coordinate of the guide 2 so as to obtain the distance.

Basing upon the forgoing formula (2), the flow chart of FIG. 3 is comprised of the steps of:

501: a tool electrode is determined to be exhausted;

502: removing the tool electrode away from the workpiece and thus rising it inside a guide;

503: guide searching downwardly by the edge finding algorithm along an edge of the guide positioned at a machining node for obtaining a distance Z1, being the distance between the guide and the machining node;

504: moving the guide to be positioned at a calibration node;

505: guide searching downwardly by the edge finding algorithm along an edge of the guide positioned at the calibration node for obtaining a distance Z2, being the distance between the guide and the calibration node;

506: using an edge finding algorithm to electrode search downwardly along an edge of the tool electrode for obtaining an after-electrical-discharge-machining coordinate Zw2 of the tool electrode;

507: calculating an electrode wear; i.e. enabling the electrode wear to be equal to $(Zw1-Zw2)+(Z1-Z2)$

508: replacing the exhausted tool electrode with another unused tool electrode; and

509: moving the new tool electrode to the machining node for initiating the same to start discharge machining.

It is noted that the electrode wear obtained by the aforesaid steps is especially adapted for application of a tool electrode performing EDM processes upon the machining depth of holes is the different; the machining nodes level and the calibration node level are not the same, and the EDM process can be perform without requiring to have information relating to the height difference between the calibration node P and the different machining surfaces 31.

Figure 6:
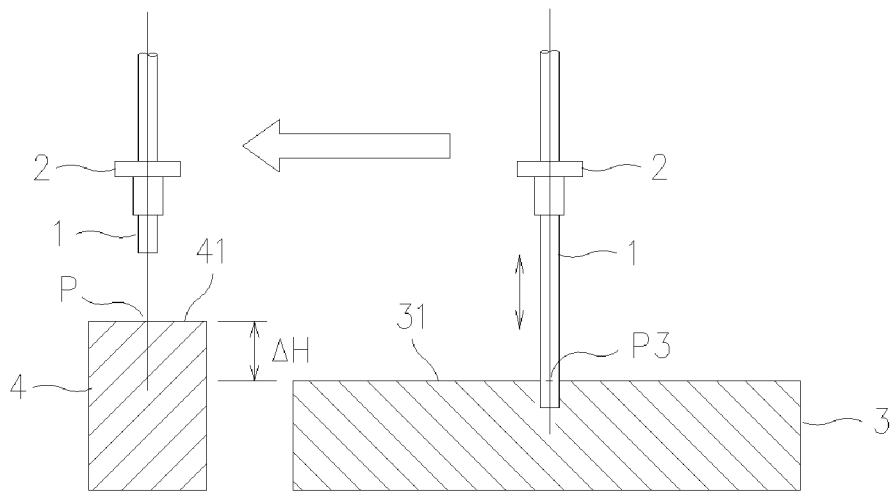
FIG. 6 is a schematic diagram showing the application of a tool electrode to perform EDM processes upon the machining depth of holes is the same, but the machining nodes level and the calibration node level are not the same using the method of the invention.
Figure 7:
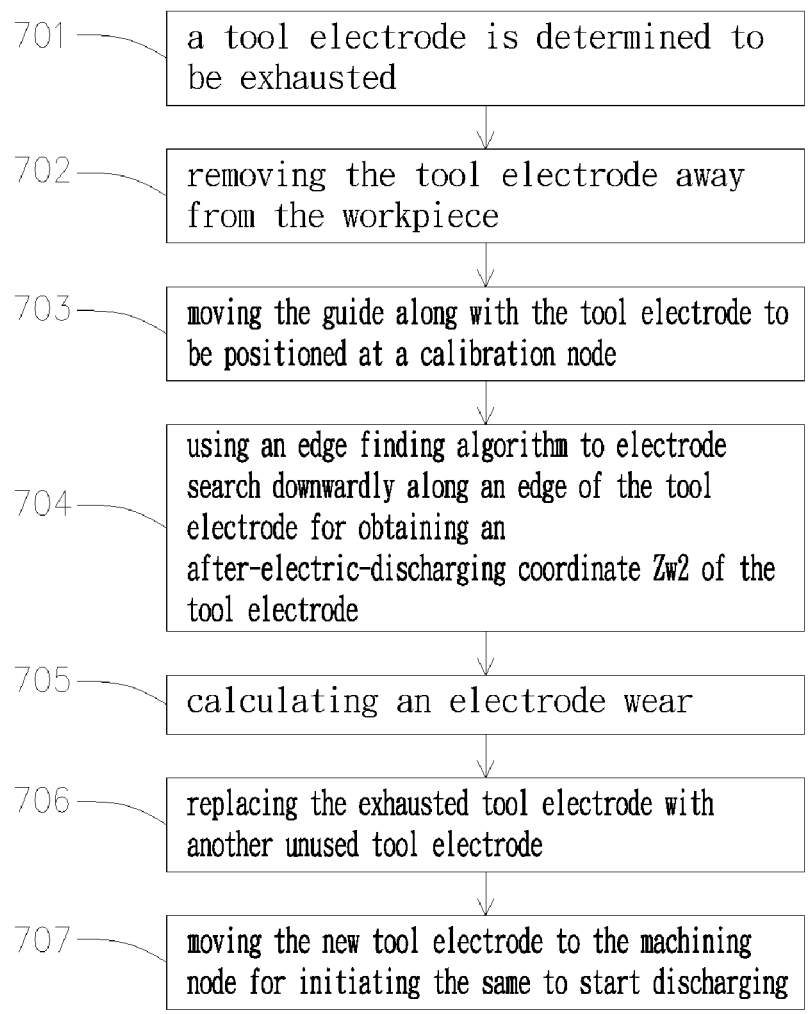
FIG. 7 is a flow chart showing the steps of electrode wear calculation used in the EDM processes of FIG. 6 according to the present invention.

Please refer to FIG. 6 and FIG. 7, which are respectively a schematic diagram showing the application of a tool electrode to perform EDM processes upon the machining depth of holes is the same and the altitude of the guide while being positioned above the calibration node is maintained to be the same with the altitude of the guide while being positioned above the machining node, but the machining nodes level and the calibration node level are not the same using the method of the invention and a flow chart showing the steps of electrode wear calculation used in the EDM processes of FIG. 6. As seen in FIG. 6, the tool electrode 1 is guided by a guide 2 for machining a workpiece 3 of the same thicknesses and datum machining level. The machining surface 31 is defined with a machining node P3, and a calibration block 4 with a calibration surface 41 is positioned next to the workpiece 3 whereas a calibration node P is defined on the calibration surface 41. It is noted that there is a high difference ΔH between the datum level of the calibration surface 41 and that of the machining surface 31, and the altitude of the guide 2 while being positioned above the calibration node P is maintained to be the same with the altitude of the guide 2 while being positioned above the machining node P3. Thereby, the electrode wear can be calculation according to the following formula:

$$\text{Electrode wear} = (Zw1 - Zw2) + \Delta H \qquad (3)$$

wherein Zw1 is an electrode coordinate obtained by the use of the edge finding algorithm to electrode search downwardly along an edge of the tool electrode guided to positioned at a machining node P before the tool electrode is used for electric discharge machining;

Zw2 is an electrode coordinate obtained by the use of the edge finding algorithm to electrode search downwardly along an edge of the tool electrode 1 guided to positioned at the calibration node P3 after the electric discharge machining of the tool electrode; and ΔH is the height difference between datum levels of the calibration node P3 and the machining node P.

Basing upon the forgoing formula (3), the flow chart of FIG. 3 is comprised of the steps of:

701: a tool electrode is determined to be exhausted;
702: removing the tool electrode away from the workpiece;
703: moving the guide along with the tool electrode to be positioned at a calibration node;
704: using an edge finding algorithm to electrode search downwardly along an edge of the tool electrode for obtaining an after-electrical-discharge-machining coordinate Zw2 of the tool electrode;
705: calculating an electrode wear; i.e. enabling the electrode wear to be equal to (Zw1−Zw2)+ΔH;
706: replacing the exhausted tool electrode with another unused tool electrode; and
707: moving the new tool electrode to the machining node for initiating the same to start discharging.

It is noted that the electrode wear obtained by the aforesaid steps is especially adapted for application of a tool electrode performing EDM processes upon a workpiece 3 while there is a high difference ΔH between the datum level of the calibration surface 41 and that of the machining surface 31, and the altitude of the guide 2 while being positioned above the calibration node P is maintained to be the same with the altitude of the guide 2 while being positioned above the machining node P3, which is referred as a simplified format of the process shown in FIG. 4.

Figure 8:
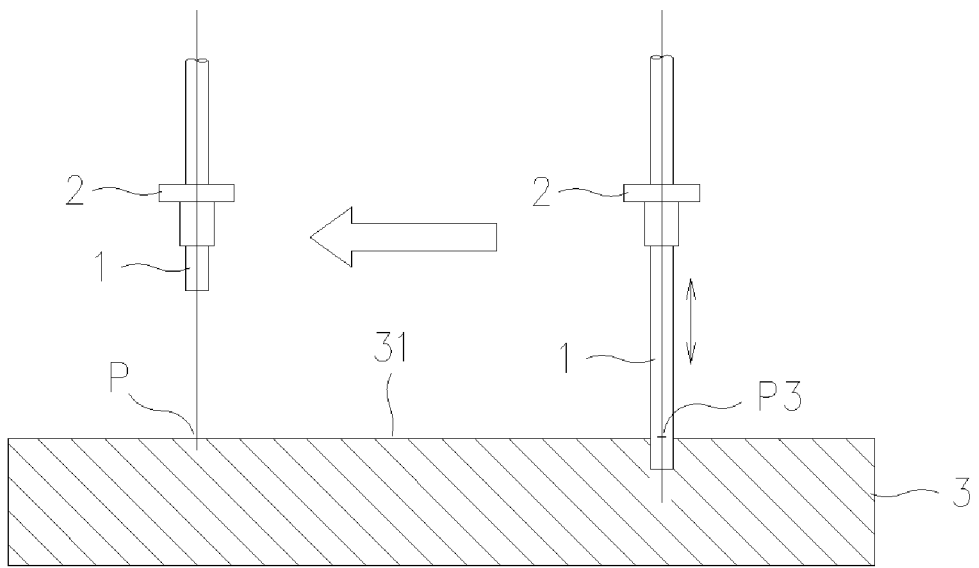
FIG. 8 is a schematic diagram showing the application of a tool electrode to perform EDM processes upon the machining depth of holes is the same; the machining nodes and the calibration node are on the same datum level using the method of the invention.

Please refer to FIG. 8, which is a schematic diagram showing the application of a tool electrode to perform EDM processes upon the machining depth of holes is the same and the altitude of the guide while being positioned above the calibration node is maintained to be the same with the altitude of the guide while being positioned above the machining node, the machining nodes and the calibration node are on the same datum level using the method of the invention, whereas the calibration node is positioned on the machining surface of the workpiece. As seen in FIG. 8, the tool electrode 1 is guided by a guide 2 for machining a workpiece 3 of the same thicknesses and datum machining level. The machining surface 31 is defined with a machining node P3 and a calibration node P. It is noted that the datum level of the calibration surface 41 is the same as that of the machining surface 31 since there are all being positioned on the same machining surface 31, and the altitude of the guide 2 while being positioned above the calibration node P is maintained to be the same with the altitude of the guide 2 while being positioned above the machining node P3. Thereby, the electrode wear can be calculation according to the following formula:

$$\text{Electrode wear} = (Zw1 - Zw2) \qquad (4)$$

wherein Zw1 is an electrode coordinate obtained by the use of the edge finding algorithm to electrode search downwardly along an edge of the tool electrode guided to positioned at a machining node P before the tool electrode 1 is used for electric discharge machining; and Zw2 is an electrode coordinate obtained by the use of the edge finding algorithm to electrode search downwardly along an edge of the tool electrode 1 guided to positioned at the calibration node P3 after the electric discharge machining The steps for calculating the electrode wear of FIG. 8 is similar to those shown in FIG. 7, the only difference is that as the calibration node P3 of FIG. 8 is positioned on the machining surface 31 at the datum level the same as the machining node P, the calculation of the electrode wear can be perform more easily and rapidly.

Figure 9:
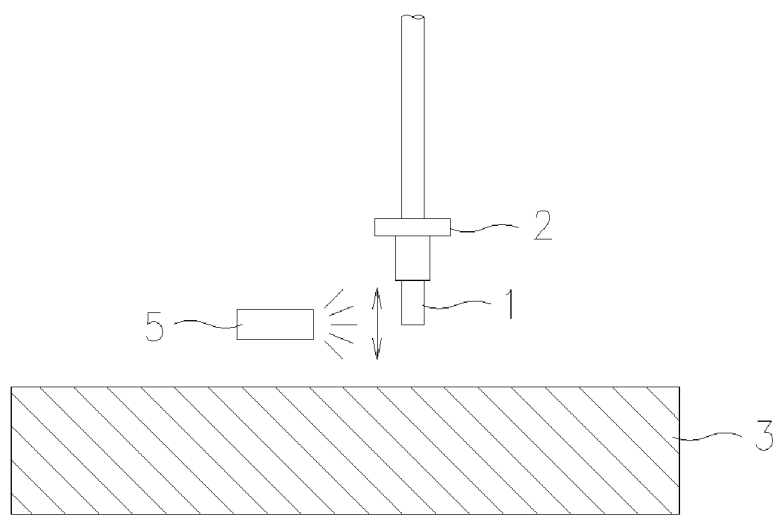
FIG. 9 is a schematic diagram illustrating the use of a sensor for detecting and measuring electrode wear in the EDM processes of FIG. 8.

Please refer to FIG. 9, which is a schematic diagram illustrating the use of a sensor for detecting and measuring electrode wear in the EDM processes of FIG. 8. The sensor 5 used in FIG. 9 can be an optical sensor, an CCD imaging device or a contact-type sensor, etc., that it can be disposed at a position under the guide 2, above the guide 2, or even inside the guide 2, whichever is appropriate.

Figure 10:
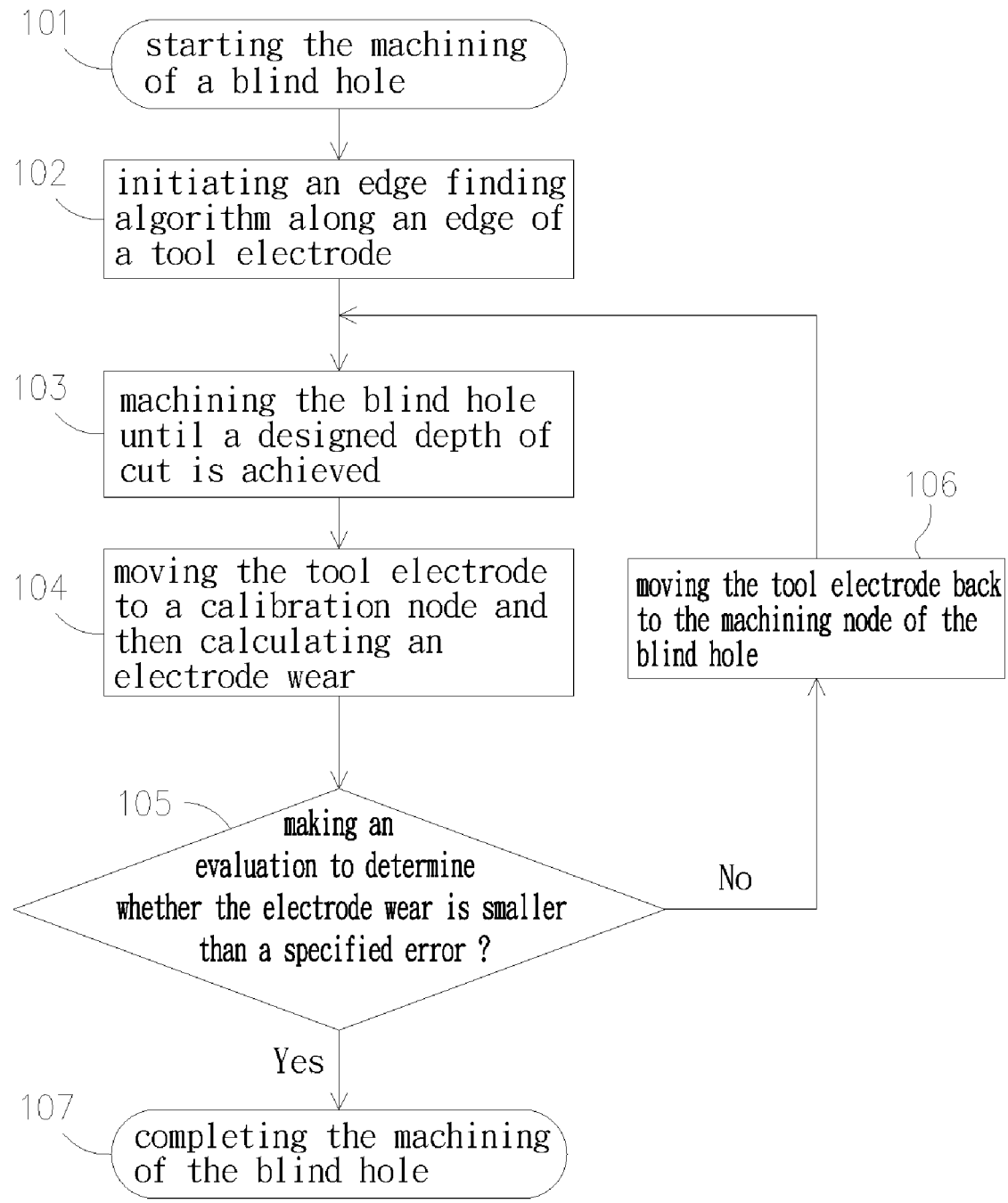
FIG. 10 is a flow chart showing the steps of electrode wear calculation used while applying the method of the present invention for machining a blind hole.

For blind hole electric discharge machining, it is noted that the depth of a blind hole machined by an EDM process is usually under the adverse affect of uneven electrode wear so that the depth of blind hole is difficult to control accurately. Therefore, it is the object of the invention to provide a method for detecting and compensating electrode wear of an electric discharge machining (EDM) process, capable of machining a blind hole precisely and accurately, as the steps shown in FIG. 10. The flow chart of FIG. 10 is comprised of the steps of:

101: starting the machining of a blind hole;
102: initiating an edge finding algorithm along an edge of a tool electrode;
103: machining the blind hole until a designed depth of cut is achieved;
104: moving the tool electrode to a calibration node and then calculating an electrode wear;
105: making an evaluation to determine whether the electrode wear is smaller than a specified error, whereas the aforesaid error comparison further comprises the steps of: specifying a error to be compared with an electrode wear, being calculated by performing the edge finding algorithm upon an electrode after it is being used for machining the blind hole on the workpiece to a designed depth of cut;
106: moving the tool electrode back to the machining node of the blind hole; i.e. when the error comparison step indicates that the calculated electrode wear is larger than the specified error, the electrode is moved back to the machining node of the blind hole for machining the same again and again until the error comparison step indicates that the calculated electrode wear is smaller than the specified error, and as soon as the error comparison step indicates that the calculated electrode wear is smaller than the specified wear error, the machining of the blind hole is complete; moreover, when the electrode is moved back to the machining node of the blind hole for machining the same again, the designed depth remains unchanged;
107: completing the machining of the blind hole.

The error can be any value at will. However, the smaller the wear error is, the more accurate the blind hole EDM machining will be. Nevertheless, it will require more repeating of step 105 and step 106. With the aforesaid steps, an total electrode wear of a blind hole machined to designed depth can be obtained after the completing of a blind hole so that a first machining depth of another blind hole to be machined right after the previously mentioned blind hole can be compensated accordingly and thus time waste for configuration an electric discharge machining can be reduced The aforesaid first machining depth obtained according to the electrode wear should be smaller than a calculated depth of first cut of the blind hole calculated based upon the predicted wear of the tool electrode for machining to desire depth so as to prevent the machining 1 depth of cut to exceed the designed depth of the blind hole. The machining depth of cut is recovered to originally desired hole depth after the first time machining in the same hole processing. Thus time waste for configuration an electric discharge machining can be reduced. Thereafter, to machining the blind hole to the designed depth, it is performed by the utilizing of the calibration node to perform a repeat electrode wear detection, thereby, the blind hole can be machined precisely and accurately.

To sum up, the present invention provides a method for detecting and compensating electrode wear of electric discharge machining (EDM), adapted for small hole drilling, micro hole machining, and electric discharge scanning, by which the wear of a used tool electrode can be detected automatically by the use of an edge finding algorithm for compensating the machining depth of an unused tool electrode without ant additional equipment while achieving accurate machining. With the aforesaid method, not only errors of conventional EDM processes, such as machining depth of cut can not be achieved accurately when a tool electrode is exhausted and replaced by another new tool electrode, can be prevented, but also it can be used for machining an blind hole with accurate depth. In addition, a database of electrode wear per unit machining depth can be achieved.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for detecting electrode wear of an electric discharge machining (EDM) process used for machining a blind hole, comprising the steps of:
    defining a calibration position for detecting an electrode wear;
    defining a machining position;
    calculating an electrode wear of a tool electrode by an edge-finding algorithm; and
    using the calculated electrode wear of the tool electrode as a cut compensation, whereas the machining depth is obtained according to the following formula: the machining depth=designed depth of cut+predicted wear of the tool electrode for machining to desire depth;
    an error comparison step, in which an error is first being specified so as to be compared with the electrode wear, being calculated by performing the edge finding algorithm upon an electrode after it is being used for machining the blind hole on the workpiece to a designed depth of cut.

2. The method of claim 1, wherein a guide is disposed in front of the tool electrode replacing the previously mentioned used tool electrode for guiding and stabilizing the movement of the tool electrode, and calculated the electrode wear of the previously used tool electrode is obtained according to the following formula:

calculated the electrode wear=$(Zw1-Zw2)+(Z1+Z2)$;

wherein $Zw1$ is an electrode coordinate obtained by the use of the edge finding algorithm to electrode search downwardly along an edge of the tool electrode positioned upon a machining position before the tool electrode is used for electric discharging machining;

$Zw2$ is an electrode coordinate obtained by the use of the edge finding algorithm to electrode search downwardly along an edge of the tool electrode positioned upon the calibration position after the electric discharging machining;

$Z1$ is a distance between the guide and the machining position when the tool electrode is upon the machining position; and $Z2$ is a distance between the guide and the calibration position when the tool electrode is upon the calibration position.

3. The method of claim 2, wherein $Z1$ is obtained by the following steps: registering an original coordinate of the guide when it is guided to the machining position; removing the tool electrode away from the workpiece and thus receiving the tool electrode into the guide while guide searching downwardly by the edge finding algorithm along an edge of the guide positioned at the machining position for obtaining a guide coordinate; and then subtracting the edged guide coordinate from the original coordinate of the guide so as to obtain the distance; and $Z2$ is obtained by the following steps: registering an original coordinate of the guide when it is moved to the calibration position; guide searching downwardly by the edge finding algorithm along an edge of the guide positioned at the calibration position for obtaining a guide coordinate; and subtracting the edged guide coordinate from the original coordinate of the guide so as to obtain the distance.

4. The method of claim 1, wherein calculated electrode wear of the previously used tool electrode is obtained according to the following formula:

calculated the electrode wear=$(Zw1-Zw2)+\Delta H$;

wherein $Zw1$ is an electrode coordinate obtained by the use of the edge finding algorithm to electrode search downwardly along an edge of the tool electrode guided to positioned at a machining position before the tool electrode is used for electric discharging machining;

$Zw2$ is an electrode coordinate obtained by the use of the edge finding algorithm to electrode search downwardly along an edge of the tool electrode guided to positioned at the calibration position after the electric discharging machining; and $\Delta H$ is the height difference between datum levels of the calibration position and the machining position.

5. The method of claim 1, wherein calculated electrode wear of the previously used tool electrode is obtained according to the following formula:

calculated the electrode wear=$(Zw1-Zw2)$;

wherein $Zw1$ is an electrode coordinate obtained with respect to the tool electrode positioned upon a machining position before the tool electrode is used for electric discharging machining; and $Zw2$ is an electrode coordinate obtained with respect to the tool electrode positioned upon the calibration position after the electric discharging machining.

6. The method of claim 5, wherein both of the electrode coordinates Zw1, and Zw2, are obtained by the use of the edge finding algorithm to electrode search downwardly along an edge of the tool electrode.

7. The method of claim 5, wherein both of the electrode coordinates Zw1, and Zw2, are detected and obtained by the use of a sensor selected from the group consisting of an optical sensor, an CCD imaging device or a contact-type sensor.

8. The method of claim 1, wherein the calibration position is positioned on the workpiece at a datum level different from or the same as that of the machining position.

9. The method of claim 1, wherein the calibration position is positioned on a calibration block while being positioned at a datum level different from or the same as that of the machining position.

10. The method of claim 1, wherein the machining of the blind hole is complete when the error comparison step indicates that the calculated electrode wear is smaller than the specified error.

11. The method of claim 1, wherein when the error comparison step indicates that the calculated electrode wear is larger than the specified error, the electrode is moved back to the machining position of the blind hole for machining the same hole again until the error comparison step indicates that the calculated electrode wear is smaller than the specified error so as to complete the machining of the blind hole.

12. The method of claim 11, wherein when the electrode is moved back to the machining position of the blind hole for machining the same hole again, the designed depth remains unchanged and predicted wear of the tool electrode for machining to desire depth is zero.

13. The method of claim 1, wherein the calculated electrode wear of a blind hole, referring as the first blind hole, is registered and used as basis for predicting wear of the tool electrode for machining to desire depth of another blind hole, referred as the second blind hole, to be machined for the first time machining right after the first blind hole, and the machining depth of cut is recovered to originally desired hole depth after the first time machining in the same hole drilling, thus time waste for configuration an electric discharge machining can be reduced.

14. The method of claim 13, wherein the machining depth of the second blind hole to be machined for the first time machining right after the first blind hole is smaller than an calculated machining depth of the second blind hole to be machined for the first time right after the first blind hole calculated based upon the predicted wear of the tool electrode for machining to desire depth.

* * * * *